(12) United States Patent
Sarnia et al.

(10) Patent No.: US 10,618,376 B2
(45) Date of Patent: Apr. 14, 2020

(54) AUTOMATIC VEHICULAR DEFOGGING SYSTEM

(71) Applicants: Hyundai America Technical Center, Inc, Superior Township, MI (US); Hyundai Motor Company, Seoul (KR); Kia Motors Corporation, Seoul (KR)

(72) Inventors: Scott Sarnia, Newport, MI (US); Ryan Fortier, Haslett, MI (US)

(73) Assignees: Hyundai America Technical Center, Inc, Superior Township, MI (US); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 789 days.

(21) Appl. No.: 15/336,914

(22) Filed: Oct. 28, 2016

(65) Prior Publication Data

US 2018/0117988 A1   May 3, 2018

(51) Int. Cl.
*B60H 1/00* (2006.01)
*G01N 27/04* (2006.01)
*B60H 1/24* (2006.01)

(52) U.S. Cl.
CPC ....... *B60H 1/00785* (2013.01); *G01N 27/048* (2013.01); *B60H 1/242* (2013.01)

(58) Field of Classification Search
CPC .............. B60H 1/00785; B60H 1/242; B60H 2001/3244; B60H 1/00735; G01N 27/048
See application file for complete search history.

(56) References Cited

U.S. PATENT DOCUMENTS

| 4,196,338 | A | * | 4/1980 | Edel | G05D 22/02 |
| | | | | | 200/61.05 |
| 4,910,967 | A | * | 3/1990 | Takahashi | B60H 1/00785 |
| | | | | | 165/223 |
| 4,942,364 | A | * | 7/1990 | Nishijima | G01N 27/121 |
| | | | | | 324/696 |
| 5,653,904 | A | * | 8/1997 | Adlparvar | B60H 1/00785 |
| | | | | | 165/43 |

(Continued)

FOREIGN PATENT DOCUMENTS

| CN | 102991440 | | 3/2013 |
| CN | 102991440 | A * | 3/2013 |

(Continued)

*Primary Examiner* — Jon T. Schermerhorn, Jr.
(74) *Attorney, Agent, or Firm* — Mintz Levin Cohn Ferris Glovsky and Popeo, P.C.; Peter F. Corless

(57) ABSTRACT

A system includes: at least one resistive humidity sensor disposed on a window of a vehicle and configured to detect a presence of fog formed on a surface of the window and to output a signal indicating whether the presence of fog formed on the surface of the window has been detected; a defogging unit equipped in the vehicle and configured to defog the window of the vehicle; and a controller coupled to the at least one resistive humidity sensor and the defogging unit and configured to receive the signal from the at least one resistive humidity sensor, to determine whether fog has formed on the surface of the window based on the received signal, and to actuate the defogging unit when it is determined that fog has formed on the surface of the window.

20 Claims, 8 Drawing Sheets

(56) References Cited

U.S. PATENT DOCUMENTS

| | | | | |
|---|---|---|---|---|
| 6,012,297 A | * | 1/2000 | Ichishi | B60H 1/00871 |
| | | | | 165/203 |
| 7,296,461 B2 | * | 11/2007 | Barguirdjian | B32B 17/10036 |
| | | | | 73/73 |
| 7,331,531 B2 | * | 2/2008 | Ruttiger | B60H 1/00785 |
| | | | | 236/44 C |
| 7,337,622 B2 | * | 3/2008 | Wang | B60H 1/00785 |
| | | | | 165/222 |
| 7,788,935 B2 | | 9/2010 | Jang et al. | |
| 8,694,205 B1 | | 4/2014 | Yerke et al. | |
| 2007/0130972 A1 | * | 6/2007 | Jang | B60H 1/00785 |
| | | | | 62/186 |
| 2007/0186649 A1 | * | 8/2007 | Sudo | G01N 27/223 |
| | | | | 73/335.04 |
| 2007/0227718 A1 | * | 10/2007 | Hill | B60H 1/00785 |
| | | | | 165/231 |
| 2008/0209923 A1 | * | 9/2008 | Errington | B60H 1/00785 |
| | | | | 62/80 |
| 2014/0026600 A1 | * | 1/2014 | Wippler | B60H 1/00785 |
| | | | | 62/80 |

FOREIGN PATENT DOCUMENTS

| | | | |
|---|---|---|---|
| JP | 2007323121 A | * | 12/2007 |
| JP | 1923737 B2 | | 4/2012 |
| KR | 20120012296 A | * | 2/2012 |
| KR | 10-2012-0012296 | | 1/2013 |
| KR | 10-1295906 | | 8/2013 |

\* cited by examiner

AUTOMATIC VEHICULAR DEFOGGING SYSTEM

TECHNICAL FIELD

The present disclosure relates generally to vehicular technologies, and more particularly, to automatic defogging systems and methods in vehicles.

BACKGROUND

It is well-known that windows of vehicles can be prone—particularly when the weather is cold—to becoming foggy. The reason for foggy car windows has to do with air temperature, either inside or outside of the vehicle, and the air's moisture content. Specifically, water vapor in the air within a vehicle's cabin condenses on the interiors of the windows when the temperature of the air next to the windows drops below a specific temperature, called the dew point—the temperature below which water droplets begin to condense and dew forms. The dew point temperature increases as humidity in the air increases. In other words, when car windows are colder than the dew point temperature, which will rise due to warm, humid air inside the car, the air close to the windows cools to below the dew point temperature as well, causing the water vapor in the air to condense and stick to the windows, causing fog. Thus, on a cold day, any moisture in the air within the vehicle's cabin—from excessive body heat, passengers exhaling, damp clothes, snow on the floormats, etc.—can turn to condensation when the warm, moist air meets the air next to the colder surfaces of the windows that is below the dew point temperature.

Many current vehicles are equipped with sensors, often mounted on the windshield, for detecting the presence of moisture or fog on the interior of a window. Such vehicles typically use a relative humidity sensor or an infrared sensor to know when moisture has formed. In response to detecting the presence of moisture, a heating, ventilating, and air conditioning (HVAC) system equipped in the vehicle can be triggered and automatically activated to defog the window, i.e., remove the moisture from the window's interior.

Conventionally, one of these sensors will be mounted at a central location on the vehicle's windshield. However, a single sensor that is centrally located will be unable to detect condensation on the edges of the windshield. A possible remedy is to install multiple sensors along the windshield to detect condensation at any area, but conventional capacitive or infrared humidity sensors are typically expensive, requiring excessively high costs to implement.

SUMMARY

The present disclosure provides a resistive humidity sensor that is designed to detect the presence of fog formed on the surface of a vehicle window, such as a windshield, and that includes a circuit embodying an outer conductive component and an inner conductive component that is enclosed within the outer conductive component. In a case where multiple sensors are disposed on the vehicle window, crosstalk (i.e., interference) among the sensors can be prevented when current flows through the circuit due to the inner conductive component being enclosed within the outer conductive component. Further, by enabling the use of multiple resistive humidity sensors disposed on the vehicle window without the hindrance of cross-talk among them, due to the above-described circuit configuration, the present disclosure provides a targeted defogging system in which each of the multiple resistive humidity sensors is capable of detecting fog on the window proximate to its respective location. Because a location of the window at which fog has formed (or not formed) can be identified, a controller equipped in the vehicle can control a defogging unit, such as a heating, ventilating, and air conditioning (HVAC) system, to specifically target and defog the identified location, without having to defog the entire window, which is both inefficient and unnecessarily expends resources that can be utilized by the vehicle for other purposes.

According to embodiments of the present disclosure, a system includes: at least one resistive humidity sensor disposed on a window of a vehicle and configured to detect a presence of fog formed on a surface of the window and to output a signal indicating whether the presence of fog formed on the surface of the window has been detected; a defogging unit equipped in the vehicle and configured to defog the window of the vehicle; and a controller coupled to the at least one resistive humidity sensor and the defogging unit and configured to receive the signal from the at least one resistive humidity sensor, to determine whether fog has formed on the surface of the window based on the received signal, and to actuate the defogging unit when it is determined that fog has formed on the surface of the window. The at least one resistive humidity sensor includes a circuit in which an amount of resistance between components of the circuit is affected by the presence of fog formed on the surface of the window, the circuit including an outer conductive component and an inner conductive component that are in contact with the window, and the inner conductive component enclosed within the outer conductive component.

The controller may be further configured to identify a location of the window at which the fog has formed based on the received signal, and further configured to control operation of the defogging unit so as to target an area of the window corresponding to the identified location of the window at which the fog has formed. In addition, the controller may be configured to identify which resistive humidity sensor of the at least one resistive humidity sensor has detected the presence of fog formed on the surface of the window based on the received signal and to identify the location of the window at which the fog has formed according to the identified resistive humidity sensor.

The defogging unit may be a heating, ventilating, and air conditioning (HVAC) system equipped in the vehicle. In this regard, the controller may be further configured to control operation of the HVAC system so as to blow air toward an area of the window corresponding to the identified location of the window at which the fog has formed. To this end, the controller may be further configured to adjust a position of one or more louvers in an air vent of the HVAC system.

The defogging unit may also be an electric defogging unit including a plurality of conductive elements embedded in the window. In this regard, the controller may be further configured to control operation of the electric defogging unit so as to activate at least one of the plurality of conductive elements proximate to an area of the window corresponding to the identified location of the window at which the fog has formed.

In addition, the controller may be further configured to determine that that the fog has formed on the surface of the window when a value indicated by the received signal satisfies a predetermined threshold. The controller may also be configured to actuate the defogging unit when it is determined that the value satisfies the predetermined threshold. Once the defogging unit has been actuated, the at least one resistive humidity sensor may be configured to output another signal indicating whether the presence of fog formed on the surface of the window has been detected. In this regard, the controller may be further configured to determine whether the fog has been removed from the surface of the window based on the signal received during operation of the defogging unit. The controller may also be configured to determine that that the fog has been removed from the surface of the window when a value indicated by the signal received during operation of the defogging unit fails to satisfy the predetermined threshold, and to deactivate the defogging unit when it is determined that the value fails to satisfy the predetermined threshold.

The circuit of the at least one resistive humidity sensor may be an amplifier circuit. The outputted signal indicating whether the presence of fog formed on the surface of the window has been detected may correspond to an output voltage of the amplifier circuit. Here, the amplifier circuit may be configured such that resistance between the outer conductive component and the inner conductive component decreases as the presence of fog on the surface of the window increases.

Additionally, the system may further include a plurality of resistive humidity sensors disposed on the window of the vehicle, whereby the plurality of resistive humidity sensors include the at least one resistive humidity sensor. In this case, each of the plurality of resistive humidity sensors is positioned apart from other resistive humidity sensors on the window, and each of the plurality of resistive humidity sensors may be positioned along one or more edges of the window.

The window of the vehicle may refer to one of a windshield, a side or door window, and a rear window.

Furthermore, according to embodiments of the present disclosure, a method includes: receiving, by a controller, a signal indicating whether a presence of fog formed on a surface of a window of a vehicle has been detected by at least one resistive humidity sensor disposed on the window of the vehicle; determining, by the controller, whether fog has formed on the surface of the window based on the received signal; and actuating, by the controller, a defogging unit that is equipped in the vehicle and configured to defog the window of the vehicle when it is determined that fog has formed on the surface of the window.

Furthermore, according to embodiments of the present disclosure, a non-transitory computer readable medium containing program instructions that are executable by a controller including a memory and a processor includes program instructions which when executed cause the controller to: receive a signal indicating whether a presence of fog formed on a surface of a window of a vehicle has been detected by at least one resistive humidity sensor disposed on the window of the vehicle; determine whether fog has formed on the surface of the window based on the received signal; and actuate a defogging unit that is equipped in the vehicle and configured to defog the window of the vehicle when it is determined that fog has formed on the surface of the window.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
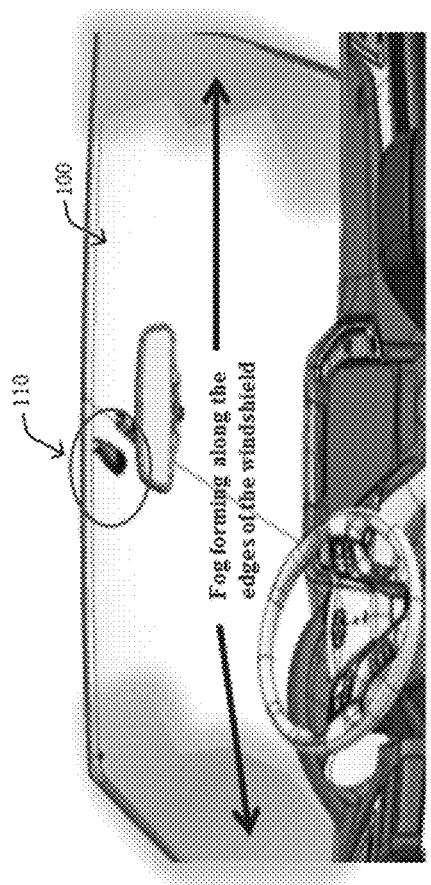
FIG. 1 illustrates a conventional vehicular humidity sensor.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, a window of a vehicle may be any window or glass panel that is part of the vehicle including, but not limited to, a windshield, a rear window, a side or door window, and the like. While a windshield is primarily referred to as the "window of the vehicle" hereinbelow, the claimed invention is not limited thereto.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller of the present disclosure may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Referring now to embodiments of the present disclosure, the disclosed resistive humidity sensor and targeted defogging system allow for detecting a location of a window at which fog has formed in a vehicle and controlling a defogging unit equipped in the vehicle so as to target the fogged area, e.g., by directing air flow in a heating, ventilating, and air conditioning (HVAC) system toward the fogged area(s) (for the purposes of the present disclosure, the terms "fog," "moisture," "dew," or the like may be used herein interchangeably). The resistive humidity sensor described herein is designed to detect the presence of fog formed on the surface (the interior surface, particularly) of a vehicle window, such as a windshield, and includes a circuit embodying an outer conductive component and an inner conductive component that is enclosed within the outer conductive component. Because the inner conductive component of the resistive humidity sensor is enclosed within the outer conductive component of the resistive humidity sensor, crosstalk (i.e., interference due to undesired signal crossing) between the resistive humidity sensor and any adjacent sensors, which leads to a degradation of accuracy in a targeted defogging system, can be prevented. Moreover, resistive humidity sensors require less cost to install, and can be installed with less complexity, than other conventional sensors, such as capacitive or infrared humidity sensors.

Preliminarily, FIG. 1 illustrates a conventional vehicular humidity sensor including a relative humidity sensor 110 disposed at a center location of the windshield 100 of a vehicle. The arrangement shown in FIG. 1 represents a conventional automatic defogging system in which a single relative humidity (or fog) sensor 110 is mounted onto an upper-center location of the windshield 100. When the sensor 110 detects the presence of fog formed on an interior surface of the windshield 100, the fog has formed in a location of the windshield 100 that is proximate to the position of the sensor 110. Consequently, if fog forms along the edges of the windshield 100, as shown in FIG. 1, the sensor 110, which is mounted at a generally central location of the windshield 100, cannot detect such fog and falsely reports that no fog has formed on the windshield 100, even though fog is presently visible to the driver, potentially obstructing the driver's view.

Figure 2:
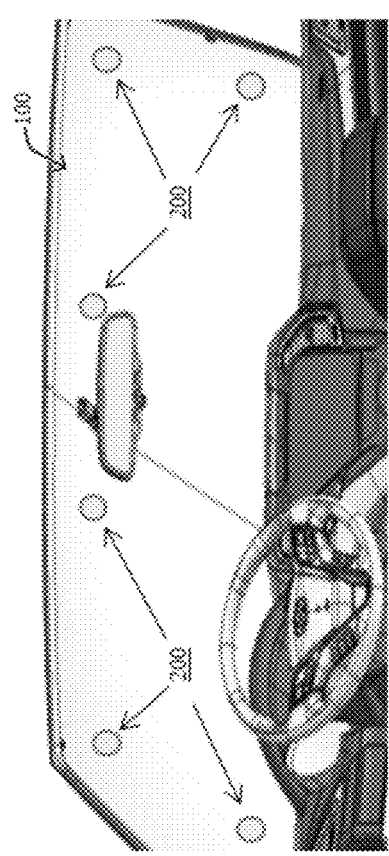
FIG. 2 illustrates an exemplary targeted defogging system including multiple resistive humidity sensors according to embodiments of the present disclosure.

In light of this shortcoming, FIG. 2 illustrates an exemplary vehicular defogging system including multiple resistive humidity sensors according to embodiments of the present disclosure. As shown in FIG. 2, multiple resistive humidity (or fog) sensors 200 may be disposed at multiple different locations of the windshield 100. Each resistive humidity sensor 200 is configured to detect the presence of fog proximate to a location of the windshield 100 at which the respective sensor 200 is installed. In addition, the resistive humidity sensors 200 may be configured to output a signal indicating whether the presence of fog formed on the windshield has been detected, as explained in further detail below. A controller 800 may receive the outputted signal, determine whether fog has formed on the windshield based on the received signal, and identify specific locations of the windshield 100 at which fog has formed (if any), as also explained in further detail below. In this manner, fog on the surface of the windshield 100 can be detected at various discrete regions of the windshield 100.

In order to detect fog which forms along the edges of the windshield 100, the resistive humidity sensors 200 may be positioned along one or more edges of the windshield 100. Each resistive humidity sensor 200 may be spaced apart from one another so as to detect fog across the entire windshield 100, enabling targeted defogging to specific areas of the windshield 100 at risk for fogging, and to reduce the risk of signal interference among the sensors 200.

The positions at which the multiple resistive humidity sensors 200 are disposed on the windshield 100 can vary according to, for instance, a desired amount of granularity (in terms of fog detection specificity), desired locations of fog detection, and the like. In other words, the multiple resistive humidity sensors 200 may be arranged in any suitable manner on the windshield 100, and thus, the arrangement shown in FIG. 2 should not be treated as limiting the scope of the claimed invention.

Each of the resistive humidity sensors 200 includes a circuit 500 in which an amount of resistance between components of the circuit 500 is affected by the presence of fog formed on the surface of the window. Specifically, the resistive humidity sensors 200 recognize changes in the resistance (or impedance) value of the sensor in response to the change in the humidity, i.e., presence of water vapor (or moisture). The amount of resistance (or impedance) present is typically inversely related to humidity. That is, in any given sensor, when the surface of the window proximate to the sensor is dry, no current flows between electrodes of the sensor, but as soon as a deposit of condensate forms on the window between the electrodes, current passes between them. In one possible configuration, if the sensor is in the presence of water vapor, the water vapor can be absorbed by a moisture-absorbing (hygroscopic) medium, such as a conductive polymer or salt, that is deposited on the electrodes. When the water vapor is absorbed, functional ionic groups of the medium disassociate, resulting in increased electrical conductivity (and decreased resistance).

However, when implementing multiple resistive humidity sensors 200 on a single window, as shown in FIG. 2, there is a risk of cross-talk (i.e., interference due to undesired signal crossing) among the sensors when signals are being outputted, which can lead to a degradation of accuracy. To overcome this obstacle, the resistive humidity sensors 200 may be designed in such a manner to prevent interference between adjacent sensors. Particularly, the circuit 500 embodied in each resistive humidity sensor 200 (configuration of the circuit 500 is described in further detail below with respect to FIG. 5) may include a first electrode (i.e., an outer conductive component) and a second electrode (i.e., an inner conductive component), whereby the inner conductive component is enclosed within the outer conductive component. The outer conductive component acts as a shield surrounding the inner conductive component, such that when a signal is sent from the sensor 200 to the controller 800, for example, the signal does not interfere with nearby sensors 200. In some implementations, the outer conductive component may refer to an anode, and the inner conductive component may refer to a cathode. In other implementations, the outer conductive component may refer to the cathode, and the inner conductive component may refer to the anode.

Figure 3:
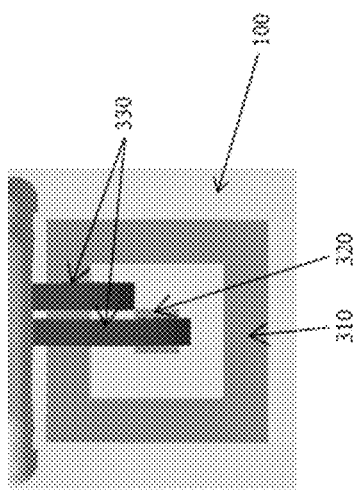
FIG. 3 illustrates an exemplary arrangement of inner and outer conductive components included in a resistive humidity sensor.

FIG. 3 illustrates an exemplary arrangement of inner and outer conductive components included in a resistive humidity sensor 200. As shown in FIG. 3, a first electrode (i.e., outer conductive component) 310 and second electrode (i.e., inner conductive component) 320 of a resistive humidity sensor 200 are disposed on a window 100 of a vehicle, such as a windshield, rear window, side or door window, or the like, so as to be in contact with the window 100, or more specifically, an interior surface of the window 100. As further shown in FIG. 3, the inner conductive component 320 may be enclosed within the outer conductive component 310, such that the outer conductive component 310 acts as a shield surrounding the inner conductive component 320, only allowing current to flow within the electrodes from the outer conductive component 310 to the inner conductive component 320. By enclosing the second electrode (i.e., inner conductive component 320) within the first electrode (i.e., outer conductive component 320) to create a shield between adjacent sensors 200, a targeted defogging system that includes multiple fog detection zones, in each of which a resistive humidity sensor 200 is positioned, can operate without the risk of cross-talk (interference with the signals of the other sensors 200) among the sensors 200.

The outer and inner conductive components 310 and 320, respectively, may be connected to other components of the circuit 500 embodied in the resistive humidity sensor 200 (hereinafter referred to as the "resistive humidity sensor circuit 500") and/or to one or more controllers 800 equipped in the vehicle via wires 330. Alternatively, signal transmission may occur wirelessly within the vehicle.

Using the outer and inner conductive components 310 and 320, the resistive humidity sensor 200 is capable of detecting the presence of fog or moisture formed on the interior surface of the window 100, and of alerting a controller 800 equipped in the vehicle of whether the presence of fog formed on the surface of the window 100 has been detected. During operation of the resistive humidity sensor 200, a voltage may be applied to the outer conductive component 310, while the inner conductive component 320 acts as the receiving cathode of the resistive humidity sensor circuit 500. (The resistive humidity sensor circuit 500, which is described in further detail below with respect to FIG. 5, may be a basic linear direct current (DC) amplifier circuit in some implementations.) The voltage may be a small positive voltage, such as 5 volts of direct current (VDC), for example. The resistive humidity sensor circuit 500 then outputs a signal, e.g., a voltage output signal, indicating whether the presence of fog formed on the surface of the window 100 has been detected. The outputted signal may be affected by the amount of resistance between the outer and inner conductive components 310 and 320, as described further below.

Initially, i.e., prior to moisture forming on the window 100, resistance between the outer conductive component 310 and the inner conductive component 320 may be at its maximum level; in other words, there is minimal conductivity between the inner and outer conductive components 310 and 320. At this point, the voltage of the signal outputted by the resistive humidity sensor circuit 500 may also be at its maximum. For instance, where the outer conductive component 310 is supplied with 5 VDC, the voltage output signal of the circuit 500 may be roughly 5 VDC when the surface of the window 100 is dry.

As moisture starts to form on the window 100, however, the resistance between the inner and outer conductive components 310 and 320 begins to decrease. More specifically, the resistance between the inner and outer conductive components 310 and 320 begins to decrease as moisture forms on the portion of the window 100 between the outer conductive component 310 and the inner conductive component 320. In general, greater amounts of moisture forming on the window 100 between the electrodes cause a greater decrease in resistance (and vice versa). This is due to the deposit of condensate forming on the window 100 between the electrodes allowing current to pass between them.

As the resistance between the inner and outer conductive components 310 and 320 decreases (and the conductivity increases), the signal outputted by the resistive humidity sensor circuit 500 can be affected proportionally. That is, as the resistance between the electrodes decreases due to increased moisture between them, the voltage of the output signal may also decrease. For instance, where the outer conductive component 310 is supplied with 5 VDC, the voltage output signal of the circuit 500 may be roughly 1 or 2 VDC when the surface of the window 100 is covered in moisture. A controller 800 can receive the signals outputted from the resistive humidity sensors 200 (each sensor 200 can output its own signal), and can determine, based on each signal (i.e., the voltage of the signal) whether fog has formed on the surface of the window 100. Then, the controller 800 can actuate a defogging unit 400 equipped in the vehicle to defog the areas of the window 100 on which the fog has formed, as explained in further detail below.

Notably, the resistance between the inner and outer conductive components 310 and 320 decreases due to moisture on the surface of the window 100 between them, even before the moisture can be visually perceived by a user (e.g., driver, passenger, etc.). Thus, the resistive humidity sensor 200 may be capable of detecting the presence of fog on the window 100, and can automatically trigger a defogging unit 400 equipped in the vehicle to defog the window 100, prior to the user actually seeing the fog on the window 100, which can prevent the fog from becoming a visual obstruction while driving. Further, due to the design of the resistive humidity sensor 200, the sensor is not prone to temperature and humidity errors, and is operable over a range of thermal conditions.

Figure 4:
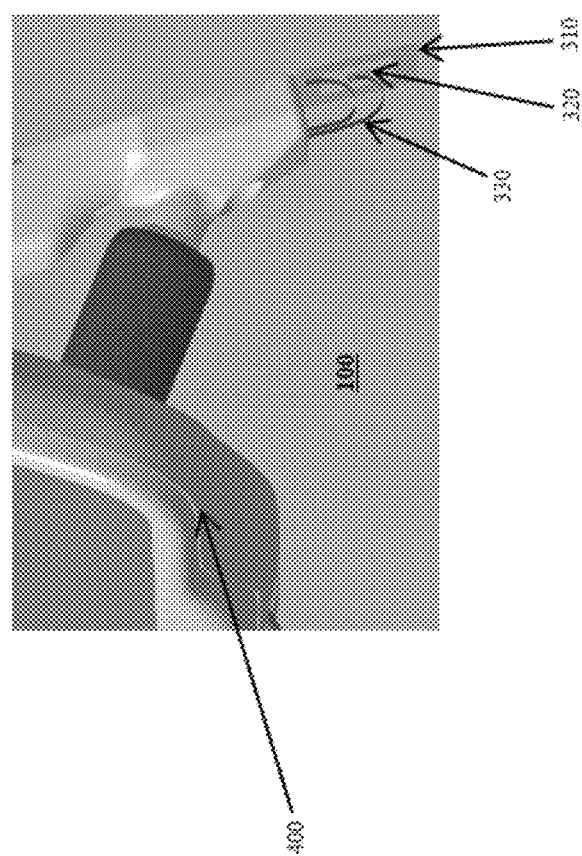
FIG. 4 illustrates an exemplary implementation of a resistive humidity sensor that is integrated with a rear-view mirror.

The resistive humidity sensors 200 may be implemented using a variety of techniques. For example, each sensor 200 (including the sensor circuit 500) may be enclosed, either partially or fully, within a housing (not shown). As another example, each sensor 200 can be impregnated into the window 100 itself (not shown). As another example, FIG. 4 illustrates an exemplary implementation of a resistive humidity sensor 200 that is integrated with a rear-view mirror 340 mounted to the windshield 100. This implementation is particularly applicable to a resistive humidity sensor 200 that is centrally positioned on the windshield 200, as the sensor 200 is coupled to the centrally positioned rear-view mirror 340. The resistive humidity sensor 200 can be integrated with the rear-view mirror 340, taking advantage of the wiring that exists within the mirror 340. This implementation can be adopted in a system where multiple resistive humidity sensors 200 are disposed along the windshield 100, and only the center-most sensor 200 is integrated with the rear-view mirror 340, or in a system where only a single resistive humidity sensor 200 is disposed on the windshield 100, and such single sensor 200 is centrally located with the rear-view mirror 340 (though in the system where only a single resistive humidity sensor 200 is used, the single sensor 200 need not necessarily be integrated with the mirror 340). In addition, as shown in FIG. 4, the wiring 330 can couple the outer and inner conductive components 310 and 320 to the wiring of the rear-view mirror 340. Here, the wiring 330 may be designed to have spring-like properties for added durability.

Figure 5:
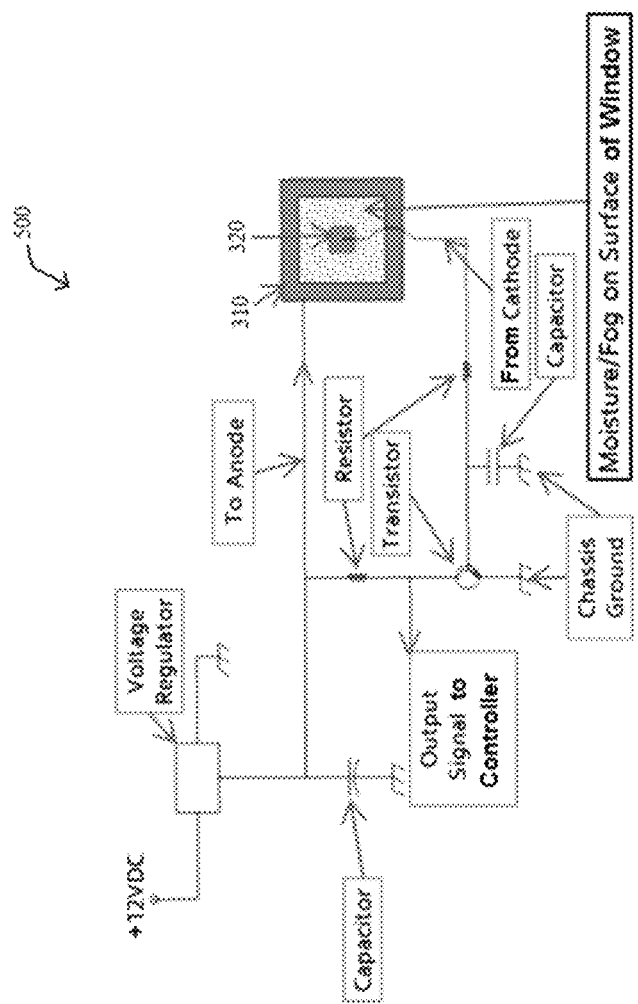
FIG. 5 illustrates an exemplary circuit diagram of a circuit embodied in a resistive humidity sensor.

FIG. 5 illustrates an exemplary circuit diagram of a circuit embodied in a resistive humidity sensor. As shown in FIG. 5, each resistive humidity sensor 200 embodies a circuit 500 including the outer conductive component 310 and the inner conductive component 320, in conjunction with other circuit elements. The circuit 500 may be, for example, an amplifier circuit (e.g., a basic linear DC amplifier circuit) that works by controlling the base of a transistor for amplifying electronic signals (shown in FIG. 5) through an anode/cathode configuration which specifically only allows current flow from the outer conductive component 310 of the sensor to the inner conductive component 320 which is enclosed within the outer conductive component 310. The exemplary circuit configuration shown in FIG. 5 utilizes primarily basic components that have a potential for a long life span, and thus is relatively simple and low cost. However, it should be understood that the circuit configuration shown in FIG. 5 is merely a single example of possible configurations for the resistive humidity sensor circuit 500. Thus, the circuit configuration shown in FIG. 5 is merely for demonstration purposes and should not be treated as the only configuration for the resistive humidity sensor circuit 500, nor treated as limiting the scope of the claimed invention.

As explained above, the circuit 500 can be configured such that resistance between the outer conductive component 310 and the inner conductive component 320 decreases as the presence of fog on the surface of the window 100 increases. The resistance between the outer conductive component 310 and the inner conductive component 320 (i.e., anode and cathode), on the order of mΩ, is proportional to the emitter/collector voltage, creating a linear output that can be processed by the controller 800, which in some instances may be vehicle central processing unit (CPU), the existing HVAC control head, or the like. In the above-referenced example where 5 VDC is supplied by the voltage source to the outer conductive component 310, the output of the circuit 500 is between 0 to 5 VDC, with 5 VDC being 0% fog (i.e., no fog). The voltage of the output signal decreases as the amount of fog on the window 100 increases. Upon receiving the output signal from the resistive humidity sensor circuit 500, the controller 800 can interpret the signal and determine whether fog has formed on the surface of the window 100 accordingly. (The controller 800 may receive multiple output signals from multiple resistive humidity sensors 200 and interpret each signal individually.) When the controller 800 determines that fog has formed on the surface of the window 100, based on the signal outputted by the resistive humidity sensor circuit 500, the controller 800 can actuate a defogging unit 400 equipped in the vehicle, as explained in further detail below.

Figure 6:
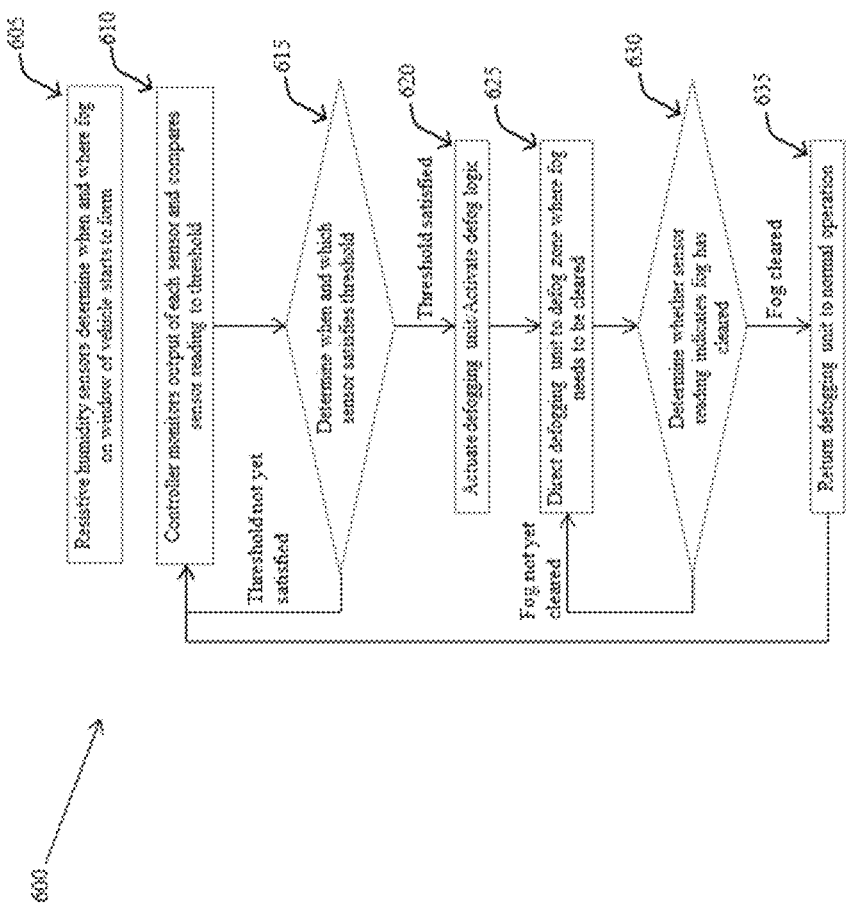
FIG. 6 illustrates an exemplary simplified procedure for controlling a targeted defogging system.

FIG. 6 illustrates an exemplary simplified procedure for controlling a targeted defogging system. The procedure 600 may start at step 605, and continue to step 610, where, as described in greater detail above, an array of resistive humidity sensors 200 disposed on a window 100 of a vehicle allow for detecting at least one location of the window 100 at which fog has formed and controlling a defogging unit 400 equipped in the vehicle so as to target the fogged area.

At step 605, the resistive humidity sensors 200 can determine when and where fog on the window 100 of the vehicle starts to form. As explained above, the resistive humidity sensors 200 can output a signal indicating whether fog has formed on the window 100, and more specifically, the portion of the window 100 that is between the outer and inner conductive components 310 and 320 of a given sensor 200. The outputted signal varies as the amount of moisture, and thus the amount of resistance between the outer and inner conductive components 310 and 320 of a given sensor 200, increases or decreases.

At step 610, the controller 800 monitors the output of each resistive humidity sensor 200. As explained above, the controller 800 can receive the outputted signals from each resistive humidity sensor 200 and interpret said signals to determine whether fog has formed on the surface of the window 100. For instance, the controller 800 can determine that that the fog has formed on the surface of the window 100 by comparing a value indicated by the received signal to a predetermined threshold and determining whether the value of the received signal satisfies the threshold. In one example, the value indicated by the received signal may refer to the voltage of the signal, and the predetermined threshold may be defined as a voltage value within the range of possible voltage readings. The predetermined threshold may be defined as any given value according to, for example, the desired responsiveness of the targeted defogging system (i.e., how quickly the defogging unit 400 is actuated).

At step 615, the controller 800 determines when a signal received from a resistive humidity sensor 200 satisfies the predetermined threshold. By way of demonstration, without limitation, if the predetermined threshold for determining that fog has formed on the window 100 is 4 V, the controller 800 may determine that fog has formed on the window 100 when the voltage of a signal received from a resistive humidity sensor 200 is less than 4 V.

Furthermore, the controller 800 can identify the resistive humidity sensor 200 that is responsible for outputting a received signal. That is, the controller 800 may identify which resistive humidity sensor 200 among all resistive humidity sensors 200 has detected the presence of fog formed on the surface of the window 100 based on the received signal. By doing so, the controller 800 can identify the location of the window 100 at which the fog has formed according to the identified resistive humidity sensor 200. This due to the fact that when a particular resistive humidity sensor 200 detects moisture on the window 100 of the vehicle, the detection of moisture is based on the presence of moisture between the outer and inner conductive components 310 and 320 of the particular resistive humidity sensor 200. Thus, when the controller 800 determines that, based on a received signal, moisture is present on the window 100, it can be deduced that the location of said moisture is local to the resistive humidity sensor 200 that outputted the received signal.

In response to determining that moisture is present on the window 100 of the vehicle, e.g., a signal outputted by a sensor 200 satisfies the predetermined threshold, the controller 800 can automatically actuate a defogging unit 400 equipped in the vehicle to defog the window 100, at step 620. (If the predetermined threshold is not satisfied, the procedure 600 returns to step 610, and the controller 800 continues to monitor the output of the resistive humidity sensors 200.) The defogging unit 400, which is configured to defog the window of the vehicle, may be, for example, a heating, ventilating, and air conditioning (HVAC) system equipped in the vehicle, an electric defogging unit including a plurality of conductive elements embedded in the window, or any other system equipped in the vehicle that is configured to remove fog that has formed on a window of the vehicle. In some implementations, the defogging unit 400 could be a separate, automatic part of the HVAC system that operates independently without driver intervention, unless manual override is selected.

At step 625, when the controller 800 has identified a location of the window 100 at which fog has formed (by identifying the resistive humidity sensor 200 responsible for transmitting a signal indicative of fog), the controller 800 can control operation of the defogging unit 400 (e.g., activate the defogging unit logic) so as to target an area of the window 100 corresponding to the identified location of the window 100 at which the fog has formed. Thus, in the case of the HVAC system, the controller 800 can control operation of the HVAC system, i.e., activate the HVAC control logic, so as to blow air toward an area of the window 100 corresponding to the identified location of the window 100 at which the fog has formed. Further, the controller 800 can control the operation of the HVAC system so as to blow air toward the identified location on the window 100 by adjusting a position of one or more louvers in an air vent of the HVAC system. The vent louvers can be adjusted using a variety of known techniques, such as the techniques described in U.S. Pat. No. 6,012,297 to Ichishi et al., the disclosure of which is hereby incorporated herein in its entirety by reference. Similarly, in the case of the electric defogging unit including a plurality of conductive elements embedded in the window 100, the controller 800 can control operation of the electric defogging unit so as to activate at least one of the plurality of conductive elements proximate to an area of the window 100 corresponding to the identified location of the window 100 at which the fog has formed.

Notably, through the implementation of the targeted defogging system described herein, the defrost ducts of a HVAC system could be redesigned so as to allow for targeted air blowing (i.e., blowing air toward specific regions of the window 100), since only a subset of the blowers need be activated in a case where fog is limited to a particular region of the window 100 (such as the edges). As a result, the HVAC system may yield lower blower voltages, increase airflow efficiency, and reduce noise, vibration, and harshness (NVH) levels, thereby reducing energy levels and improving the overall user experience.

At step 630, the controller 800 can determine, based on additional outputs received from the resistive humidity sensors 200 during the operation of the defogging unit 400, whether the fog previously detected on the window 100 has cleared. In this regard, during operation of the defogging unit 400, the resistive humidity sensors 200 can output additional signals indicating whether the presence of fog formed on the surface of the window 100 has been detected, that is, whether the fog is still present on the window 100 or, vice versa, whether the fog has been cleared. Upon receiving the additional signals transmitted from the resistive humidity sensors 200 during operation of the defogging unit 400, the controller 800 may then determine whether the fog has been removed from the surface of the window 100 based on the received signal. To this end, the controller 800 can again compare a value indicated by the received signal(s) to the predetermined threshold. For instance, if the value indicated by the signal no longer satisfies the predetermined threshold, the controller 800 can determine that the fog has been removed (or at least sufficiently removed) from the window 100. It should be understood that the threshold can be predetermined in any manner suitable for determining whether a value indicated by the received signals has reached a particular level, and the threshold as it is described hereinabove is merely for demonstration purposes and should not be treated as limiting the scope of the claimed invention.

If the controller 800 determines, based on the signals received from the resistive humidity sensors 200 during the operation of the defogging unit 400, that the fog has cleared (or has sufficiently cleared) from the window 100, the controller 800 can then deactivate the defogging unit 400 or control the defogging unit 400 such that it returns to normal operation, at step 635. (If the fog has not yet cleared, according to the received signals, the procedure 600 returns to step 625.) At this point, the controller 800 can continue to monitor the signals being outputted by the resistive humidity sensors 200, and repeat steps 610 through 635 as necessary.

The procedure 600 illustratively ends at step 635. The techniques by which the steps of procedure 600 may be performed, as well as ancillary procedures and parameters, are described in detail throughout the present disclosure.

It should be noted that the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 7:
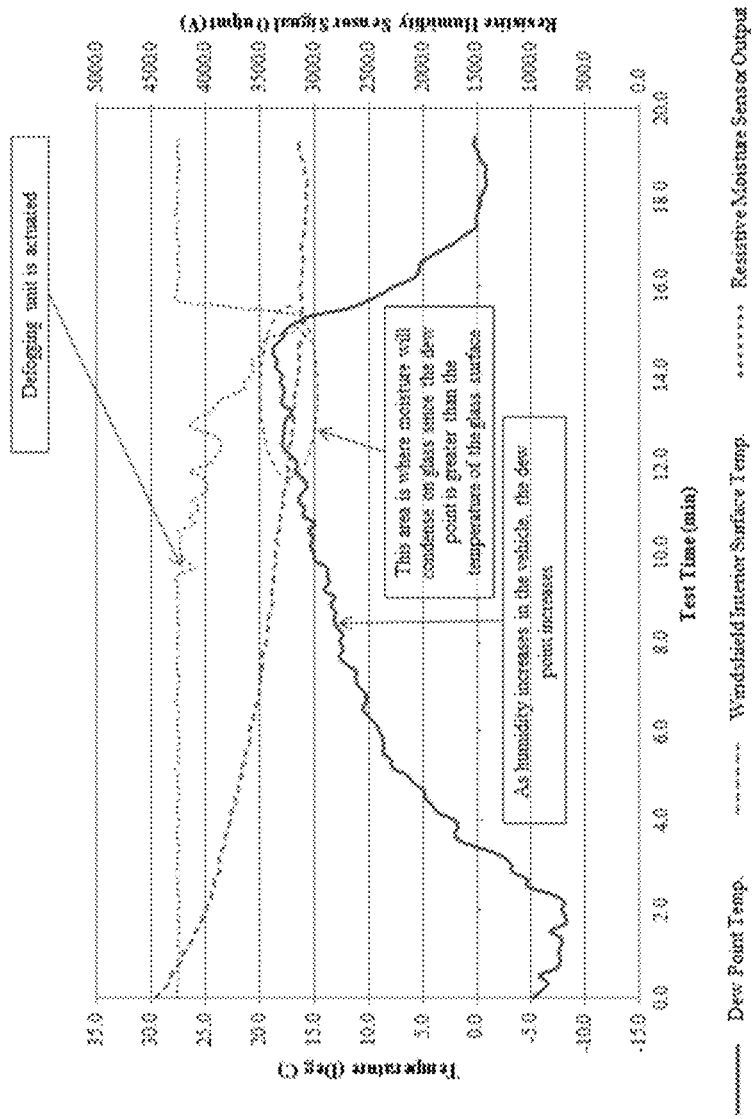
FIG. 7 illustrates a graph demonstrating an exemplary operation of the targeted defogging system.

FIG. 7 illustrates a graph demonstrating an exemplary operation of the targeted defogging system described hereinabove. As shown in FIG. 7, the formation of moisture on the interior surface of the vehicle's windshield (or other window) depends on the relationship between the dew point temperature in the vehicle cabin and the temperature of the air next to the interior surface of the windshield. As humidity increases inside the vehicle—due to excessive body heat, passengers exhaling, damp clothes, snow on the floormats, etc.—the dew point temperature increases, as the air inside the vehicle is becoming more saturated with water vapor. Eventually, if the dew point increases beyond the temperature of the air next to the interior surface of the windshield, the moisture in the air will condense, causing water droplets to stick to the interior surface of the windshield. At this point, the moisture becomes visible, and fog forms on the surface of the windshield.

Meanwhile, the resistive humidity sensors 200 disposed along the windshield are sensing the presence of moisture based on the amount of resistance between the outer and inner conductive components 310 and 320 included in each respective sensor 200, as explained above. Once the controller 800 determines that the voltage or some other value of signals transmitted by the resistive humidity sensors 200 satisfies a predetermined threshold, the defogging unit 400 can be actuated. Notably, because the resistance of the outer and inner conductive components 310 and 320 included in each respective sensor 200 can be affected by the presence of moisture even before the water vapor condenses onto the surface of the windshield, the defogging unit 400 can be actuated prior to the driver and/or passengers visibly recognizing fog on the windshield, as demonstrated in FIG. 7. Then, once the controller 800 determines, based on the signals received from the resistive humidity sensors 200 during the operation of the defogging unit 400, that the fog has cleared (or has sufficiently cleared) from the window 100, the controller 800 can then deactivate the defogging unit 400 or control the defogging unit 400 such that it returns to normal operation.

Figure 8:
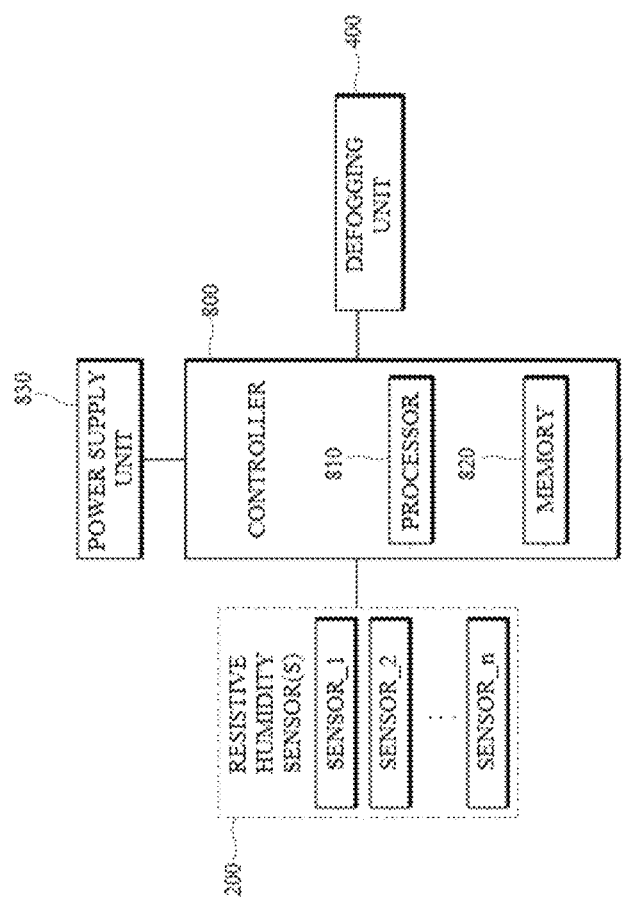
FIG. 8 illustrates an exemplary diagrammatic representation of a system architecture of the targeted defogging system.

FIG. 8 illustrates an exemplary diagrammatic representation of a system architecture of the targeted defogging system. As shown in FIG. 8, the controller 800 may be communicatively and operably coupled to the at least one resistive humidity sensors 200 and the defogging unit 400. In this configuration, signals can be transmitted between the resistive humidity sensors 200 and the controller 800, as well as between the defogging unit 400 and the controller 800. Additionally, the controller 800 may include a memory 820 and a processor 810, where the memory 820 is configured to store program instructions, and the processor 810 is specifically programmed to execute the program instructions to perform one or more processes which are described herein. The controller 800 may receive power supplied from a power supply unit 830 equipped in the vehicle. It should be understood that the system architecture depicted in FIG. 8 is greatly simplified, as numerous components required for the typical operation of the vehicle are beyond the scope of the present disclosure and thus omitted.

Accordingly, techniques are described herein that provide a resistive humidity sensor which, when compared to capacitive or infrared humidity sensors employed in conventional automatic defogging systems, is easier to install and has a smaller size, lower cost, longer operational life, and greater interchangeability. In addition, the targeted defogging system described herein allows for redesign of the defrost ducts of a HVAC system so as to allow for targeted air blowing, since only a subset of the blowers need be activated in a case where fog is limited to a particular region of the window. As a result, the HVAC system may yield lower blower voltages, increase airflow efficiency, and reduce NVH levels, thereby reducing energy levels and improving the overall user experience.

While there have been shown and described illustrative embodiments that provide for a resistive humidity sensor and targeted defogging system, it is to be understood that various other adaptations and modifications may be made within the spirit and scope of the embodiments herein. For example, the embodiments have been primarily shown and described herein with relation to resistive humidity sensors disposed on the windshield of the vehicle. However, such sensors may also be disposed on the rear window, side or door windows, or any other vehicle windows where fog may form. Moreover, the inner and outer conductive components have been primarily shown in the figures as having a square-like shape. However, the inner and outer conductive components are not limited as such, and the inner and outer conductive components may be formed in any shape, so long as the inner conductive component is enclosed within the outer conductive component. Thus, it should be understood that the embodiments of the present disclosure may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
   at least one resistive humidity sensor disposed on a window of a vehicle and configured to detect a presence of fog formed on a surface of the window and to output a signal indicating whether the presence of fog formed on the surface of the window has been detected;
   a defogging unit equipped in the vehicle and configured to defog the window of the vehicle; and
   a controller coupled to the at least one resistive humidity sensor and the defogging unit and configured to receive the signal from the at least one resistive humidity sensor, to determine whether fog has formed on the surface of the window based on the received signal, and to actuate the defogging unit when it is determined that fog has formed on the surface of the window,
   wherein the at least one resistive humidity sensor includes a circuit in which an amount of resistance between components of the circuit is affected by the presence of fog formed on the surface of the window, the circuit including an outer conductive component and an inner conductive component that are in contact with the window, and the inner conductive component enclosed within the outer conductive component.

2. The system of claim 1, wherein the controller is further configured to identify a location of the window at which the fog has formed based on the received signal.

3. The system of claim 2, wherein the controller is further configured to control operation of the defogging unit so as to target an area of the window corresponding to the identified location of the window at which the fog has formed.

4. The system of claim 3, wherein the defogging unit is a heating, ventilating, and air conditioning (HVAC) system equipped in the vehicle, and the controller is further configured to control operation of the HVAC system so as to blow air toward an area of the window corresponding to the identified location of the window at which the fog has formed.

5. The system of claim 4, wherein the controller is further configured to control operation of the HVAC system so as to blow air toward an area of the window corresponding to the identified location on the window at which the fog has formed by adjusting a position of one or more louvers in an air vent of the HVAC system.

6. The system of claim 3, wherein the defogging unit is an electric defogging unit including a plurality of conductive elements embedded in the window, and the controller is further configured to control operation of the electric defogging unit so as to activate at least one of the plurality of conductive elements proximate to an area of the window corresponding to the identified location of the window at which the fog has formed.

7. The system of claim 2, wherein the controller is further configured to identify which resistive humidity sensor of the at least one resistive humidity sensor has detected the presence of fog formed on the surface of the window based on the received signal and to identify the location of the window at which the fog has formed according to the identified resistive humidity sensor.

8. The system of claim 1, wherein the controller is further configured to determine that that the fog has formed on the surface of the window when a value indicated by the received signal satisfies a predetermined threshold.

9. The system of claim 8, wherein the controller is further configured to actuate the defogging unit when it is determined that the value satisfies the predetermined threshold.

10. The system of claim 9, wherein, during operation of the defogging unit, the at least one resistive humidity sensor is further configured to output another signal indicating whether the presence of fog formed on the surface of the window has been detected, and the controller is further configured to determine whether the fog has been removed from the surface of the window based on the signal received during operation of the defogging unit.

11. The system of claim 10, wherein the controller is further configured to determine that that the fog has been removed from the surface of the window when a value indicated by the signal received during operation of the defogging unit fails to satisfy the predetermined threshold.

12. The system of claim 11, wherein the controller is further configured to deactivate the defogging unit when it is determined that the value fails to satisfy the predetermined threshold.

13. The system of claim 1, wherein the circuit is an amplifier circuit, and the outputted signal indicating whether the presence of fog formed on the surface of the window has been detected corresponds to an output voltage of the amplifier circuit.

14. The system of claim 13, wherein the amplifier circuit is configured such that resistance between the outer conductive component and the inner conductive component decreases as the presence of fog on the surface of the window increases.

15. The system of claim 1, further comprising a plurality of resistive humidity sensors disposed on the window of the vehicle, the plurality of resistive humidity sensors including the at least one resistive humidity sensor.

16. The system of claim 15, wherein each of the plurality of resistive humidity sensors is positioned apart from other resistive humidity sensors on the window.

17. The system of claim 15, wherein each of the plurality of resistive humidity sensors is positioned along one or more edges of the window.

18. The system of claim 1, wherein the window of the vehicle refers to one of a windshield, a side or door window, and a rear window.

19. A method comprising:
receiving, by a controller, a signal indicating whether a presence of fog formed on a surface of a window of a vehicle has been detected by at least one resistive humidity sensor disposed on the window of the vehicle;
determining, by the controller, whether fog has formed on the surface of the window based on the received signal; and
actuating, by the controller, a defogging unit that is equipped in the vehicle and configured to defog the window of the vehicle when it is determined that fog has formed on the surface of the window,
wherein the at least one resistive humidity sensor includes a circuit in which an amount of resistance between components of the circuit is affected by the presence of fog formed on the surface of the window, the circuit including an outer conductive component and an inner conductive component that are in contact with the window, and the inner conductive component enclosed within the outer conductive component.

20. A non-transitory computer readable medium containing program instructions that are executable by a controller including a memory and a processor, which when executed cause the controller to:
receive a signal indicating whether a presence of fog formed on a surface of a window of a vehicle has been detected by at least one resistive humidity sensor disposed on the window of the vehicle;
determine whether fog has formed on the surface of the window based on the received signal; and
actuate a defogging unit that is equipped in the vehicle and configured to defog the window of the vehicle when it is determined that fog has formed on the surface of the window,
wherein the at least one resistive humidity sensor includes a circuit in which an amount of resistance between components of the circuit is affected by the presence of fog formed on the surface of the window, the circuit including an outer conductive component and an inner conductive component that are in contact with the window, and the inner conductive component enclosed within the outer conductive component.

* * * * *